(12) United States Patent
Polk et al.

(10) Patent No.: US 7,416,244 B2
(45) Date of Patent: Aug. 26, 2008

(54) VIBRATION ISOLATOR WITH LIMITED FREE MOVEMENT

(75) Inventors: Gary C. Polk, Lake Zurich, IL (US); Bin Lou, Bolingbrook, IL (US)

(73) Assignee: CNH America LLC, New Holland, PA (US)

(*) Notice: Subject to any disclaimer, the term of this patent is extended or adjusted under 35 U.S.C. 154(b) by 31 days.

(21) Appl. No.: 11/368,709

(22) Filed: Mar. 6, 2006

(65) Prior Publication Data

US 2007/0214685 A1    Sep. 20, 2007

(51) Int. Cl.
*B62D 27/04* (2006.01)
*F16F 15/08* (2006.01)

(52) U.S. Cl. .......................... 296/190.07; 296/190.03; 296/1.03; 296/35.1; 267/258; 248/638

(58) Field of Classification Search ............ 296/190.03, 296/190.07, 1.03, 204, 35.1–35.3; 180/89.12; 248/560–635, 637–681; 267/258
See application file for complete search history.

(56) References Cited

U.S. PATENT DOCUMENTS

| | | | |
|---|---|---|---|
| 875,766 A | 1/1908 | Allen | |
| 2,514,811 A * | 7/1950 | Stephenson et al. | 267/140.3 |
| 3,008,016 A * | 11/1961 | Mercier | 200/50.21 |
| 3,146,979 A * | 9/1964 | Keetch | 248/563 |
| 3,966,009 A | 6/1976 | Meacock, II et al. | 180/89 A |
| 4,014,588 A * | 3/1977 | Kohriyama | 296/35.1 |
| 4,135,757 A * | 1/1979 | Smith et al. | 296/35.1 |
| 4,235,470 A | 11/1980 | Kauss et al. | 296/190 |
| 4,265,328 A | 5/1981 | Rowa et al. | 180/89.13 |
| 4,271,921 A | 6/1981 | Ochsner | 180/89.12 |
| 4,286,777 A * | 9/1981 | Brown | 267/294 |
| 4,438,825 A | 3/1984 | Stephens | 180/89.12 |
| 4,451,079 A | 5/1984 | Takahashi | 296/190 |
| 4,530,491 A * | 7/1985 | Bucksbee et al. | 267/141 |
| 4,783,039 A * | 11/1988 | Peterson et al. | 248/635 |
| 4,819,980 A * | 4/1989 | Sakata et al. | 296/35.1 |
| 4,858,880 A * | 8/1989 | Durand | 248/635 |
| 4,998,592 A | 3/1991 | Londt et al. | 180/89.12 |
| 5,265,995 A | 11/1993 | Beck | 414/694 |
| 5,368,118 A | 11/1994 | Hoefle | 180/89.12 |
| 5,486,031 A | 1/1996 | Ronchetti et al. | 296/10 |
| 5,799,930 A * | 9/1998 | Willett | 267/141.4 |
| 6,017,073 A * | 1/2000 | Lindblom et al. | 296/35.1 |
| 6,340,201 B1 | 1/2002 | Higuchi | 296/190.07 |
| 6,354,578 B1 * | 3/2002 | Nakatsukasa et al. | 267/258 |

FOREIGN PATENT DOCUMENTS

DE    4102526    7/1992
JP    06016152 A *   1/1994

* cited by examiner

*Primary Examiner*—Dennis H. Pedder
*Assistant Examiner*—Mike Hernandez
(74) *Attorney, Agent, or Firm*—Michael G. Harms; John William Stader; Patrick M. Cheldrake

(57) ABSTRACT

A vibration isolator including at least one bearing element or assembly providing a contact interface along which structural elements connected together by the vibration isolator are allowed to substantially freely move within a limited range one relative to the other, with the effect of isolating the respective structural elements from vibrations or vibratory movements of the other structurally element, particular those vibratory movements directed or oriented at least generally along or parallel to the contact interface, with particular effect for isolating low frequency vibratory movements.

33 Claims, 14 Drawing Sheets

VIBRATION ISOLATOR WITH LIMITED FREE MOVEMENT

TECHNICAL FIELD

This invention relates generally to a vibration isolator, and more particularly, to a vibration isolator including at least one bearing element or assembly providing a contact interface along which structural elements connected together by the vibration isolator are allowed to substantially freely move within a limited range one relative to the other, with the effect of isolating one structural element from vibrations or vibratory movements of the other structural element, particularly those vibratory movements directed or oriented at least generally along or parallel to the contact interface, with particular effect for isolating low frequency vibrations of relatively large amplitude, but not limited to low frequency and large amplitude.

BACKGROUND ART

Vibration generally, and particularly of structural elements supporting humans and sensitive equipment and apparatus, can have many negative effects. Such negative effects can include, but are not limited to, discomfort to, and premature fatigue of, human operators and passengers, and noise and degradation of equipment.

A category or type of vibrations generated during operation of vehicles, and particularly, work machines such as those used in agricultural, construction, mining, forestry and earthmoving applications, hereinafter sometimes collectively referred to by the term "work machine", is low frequency, relatively high amplitude vibrations, having generally horizontal or planar vectors or components. Such low frequency horizontal vibrations can be especially discomforting to human operators and passengers of the vehicles and machines who are supported on structures such as operator and passenger cabs and seats, and who are subjected to such vibrations for long periods of time.

Vibrations of this category can include horizontal vibrations, including fore and aft and side-to-side vibrations; pitch vibrations; roll vibrations; and yaw vibrations, and can result from one or more sources, including environmental and external sources, such as rough terrain and roads over which a work machine passes, and internal sources, such as engine and power train operation, lugged wheel rotation, and particularly, operation of various systems of a work machine. In this latter regard, agricultural work machines, and specifically harvesting machines such as combines, windrowers and cotton harvesters, can include multiple operating systems in addition to the power plant and drive train, which generate a multitude of potentially annoying and discomforting low frequency vibrations. Towing loads, such as grain carts, by a harvesting machine or tractor, can also generate these types of vibratory movements. Such vibrations and vibratory movements are typically within a range of from about 1 to about 20 cycles per second (Hz), and up to as much as about 100 Hz, and can have a wide variety of amplitudes, for instance, of as much as 15 millimeters. The characteristics of the rubber mount will not effectively isolate the low frequency vibrations in the horizontal or vertical directions. Accordingly, generally horizontal, low frequency, high amplitude vibrations and resulting vibratory movements of structural elements of work machines such as those set forth above have been found to be particularly problematic and difficult to isolate or reduce.

Compounding this difficulty, is that a work machine such as a combine, windrower or cotton harvester, may have several sources generating these vibrations in different directions. Examples of systems on a typical agricultural combine which have been found to generate particularly annoying and discomforting low frequency vibrations include the sidewardly reciprocating cutter knife or sickle bar of a small grain header; the fore and aft reciprocating cleaning shoes or sieves of the cleaning system; and various rotating apparatus, including the rotary separator, and numerous conveyor devices. Large lugged tires can also generate annoying low frequency, low amplitude vibrations when rolling.

A variety of mounts and support structures for operator and passenger cabs and platforms, seats, and the like, have been proposed for isolating, damping, and attenuating vibrations of work machines and vehicles. Reference in this regard Ochsner U.S. Pat. No. 4,271,921, issued Jun. 9, 1981 to Deere & Company; Hoefle U.S. Pat. No. 5,368,118, issued Nov. 29, 1994 to Deere & Company; and Higuchi U.S. Pat. No. 6,340, 201, issued Jan. 22, 2002 to Hitachi Construction Machinery Co., Limited. However, observed shortcomings of these and other known proposed devices variously include, high complexity and expense; requirements of tuning for achieving desired vibration attenuation; and, in the instance of the latter referenced patent, possible increases in horizontal vibratory movements as a consequence of reducing occurrences of pitching, rolling and yawing vibrations.

It is also well known to use rubbery, viscous, and pneumatic devices for vibration isolation. Essentially, known devices of these types simulate a spring and damper system in connection with a movable mass, for reducing vibration transmission. However, it has been found that such devices still provide only poor reduction of transmission or isolation of the low frequency horizontal vibration and vibratory movements identified as problems above. In particular, known rubbery vibration isolators have been found to only provide satisfactory vibration isolation when the forcing frequency $f_d$ of the vibration is significantly larger than the natural frequency $f_n$ of the isolator itself. And, when the forcing frequency $f_d$ is near or less than the natural frequency $f_n$, the isolator can actually amplify the vibration. One proposed approach to isolate low frequency vibration has been to use a pneumatic mount that has a very low natural frequency. However, this has been found to have negative effects, including high costs, and large size. The effectiveness of pneumatic devices can also be temperature sensitive.

Thus, what is sought is a vibration isolator adapted for isolating low frequency vibrations and vibratory movements, particularly high amplitude, horizontal components or vectors thereof, which overcomes one or more of the shortcomings and/or limitations set forth above, and which is adapted for use in connection with support structures and elements for holding or carrying human operators and passengers on vehicles and work machines, such as agricultural harvesting machines, tractors and the like.

SUMMARY OF THE INVENTION

What is disclosed is a vibration isolator which is adapted for isolating low frequency vibrations and vibratory movements, particularly high amplitude, horizontal or planar components or vectors thereof, including fore and aft and side-to-side vibrations and vibratory movements, and also including vertical vibrations, pitch vibrations, roll vibrations and yaw vibrations, and which vibration isolator overcomes one or more of the problems and shortcomings set forth above, and which is advantageous for use in connection with a support structure for a human operator and/or passenger of a vehicle or work machine, including, but not limited to, a work machine such as an agricultural harvesting machine, a tractor, or the like.

According to a preferred aspect of the invention, the vibration isolator includes a connector assembly configured for extending in a predetermined direction for connecting two structural elements together. Such structural elements can include, but are not limited to, a frame of a work machine or vehicle, and a structure for supporting an operator and/or passenger, such as an operator cab or platform, a seat, or the like, and thus a preferred predetermined direction is upward and downward or generally vertical. The connector assembly has at least one connector element configured for extending in the predetermined direction between structural elements connected together by the connector assembly, and retainer elements in connection with opposite end portions of the at least one connector element and cooperatively engageable with structural elements connected together by the connector assembly, respectively. The connector assembly is configured for allowing relative movements of structural elements connected together by the connector assembly in any direction generally perpendicular to the predetermined direction within a predetermined range of movement, which will correspond to the directions in which the low frequency vibrations and vibratory movements are sought to be isolated. Thus, for the machine frame and operator or passenger support structure connection, these directions will include generally horizontal directions, and the range of movement preferable will encompass an amplitude or extent or anticipated vibrations or vibratory movements to be isolated.

The vibration isolator preferably also includes an optional resilient element retained between the opposite end portions of the at least one connector element, so as to be located between two structural elements connected together by the connector assembly in a position for resiliently absorbing at least a portion of any vibrations or shock loads exerted in the predetermined direction, that is, perpendicular to the directions for which the low frequency vibrations are to be isolated. For instance, for the work machine example, the predetermined direction will be vertical, and the resilient element can be configured for resiliently absorbing anticipated vibrations or shock loads exerted by one or both of the structural elements in the vertical direction, as well as pitch, roll and yaw vibrations.

Further, and importantly, the vibration isolator preferably includes at least one bearing element or assembly disposed between the opposite end portions of the at least one connector element and configured for bearing or carrying loads exerted in the predetermined direction, while allowing substantially free relative movements, including linear movements, of two structural elements connected together by the connector assembly in substantially any directions generally perpendicular to the predetermined direction within the predetermined range of movement allowed by the connector assembly. As a result, vibrations and vibratory movements of one of the structural elements, for instance, horizontal components of vibrations and vibratory movements of a frame of a work machine, are substantially freely allowed in any direction which is generally perpendicular to the predetermined direction, as restrained only by the range of movement allowed by the connector assembly.

As explained above, many annoying and discomforting vibratory movements of work machines such as agricultural harvesting machines and tractors have been found to be in a very low frequency range of less than about 100 Hz, but have relatively large amplitudes, typically within a range of up to about 15 millimeters. Accordingly, the predetermined range of movement for the work machine example preferable has an extent of about this amount, 15 millimeters. However, it should be noted that this value can be set or adjusted as desired or required for a particular application.

A preferred bearing element or assembly of the present invention is a plurality of ball transfer units, which can be, for instance, a plurality of well-known, commercially available ball transfer units, such as are available worldwide from SKF Group. Such ball transfer units typically include a ball bearing of a first diametrical extent supported by a plurality of ball bearings of a second diametrical extent smaller than the first diametrical extent, so as to have low frictional resistance to rolling movements of the larger ball bearing. The larger ball bearing is, in turn, disposed in a load bearing position defining a contact interface between the two structural elements, along which the substantially free relative movements of the structural elements is allowed. As a result of the preferred combination of resilient element and bearing element, cushioning of shock loads in the predetermined direction, which is vertically in the work machine example, is provided by the resilient element, and isolation from vibrations is provided by the bearing element or assembly.

As an alternative bearing element or assembly, a plurality of ball bearings can be utilized, preferable retained in an array around the connector element or a center region of the vibration isolator. Other bearing elements or assemblies can include a layer of low viscosity fluid forming a bearing such as an air bearing; or a gas or a liquid medium bearing, which medium can be contained in a bladder, a bag, or other container which allows movement perpendicular to the predetermined direction only; a magnetic levitation bearing; or one or more very low friction linear bearings, which bearings allow vibratory movement perpendicular to the predetermined direction only.

Still further, as a preferred aspect of the invention, a plurality of the vibration isolators are utilized for supporting an operator cab or seat of a work machine on a frame of the machine, so as to allow substantially free horizontal or planar movements of the frame relative to the cab, thereby providing isolation of the cab from the annoying and discomforting low frequency horizontal vibratory movements of the frame resulting from operation of various systems of the work machine, and movements of the work machine over a surface, such as the ground or a road.

DETAILED DESCRIPTION OF THE INVENTION

Figure 1:
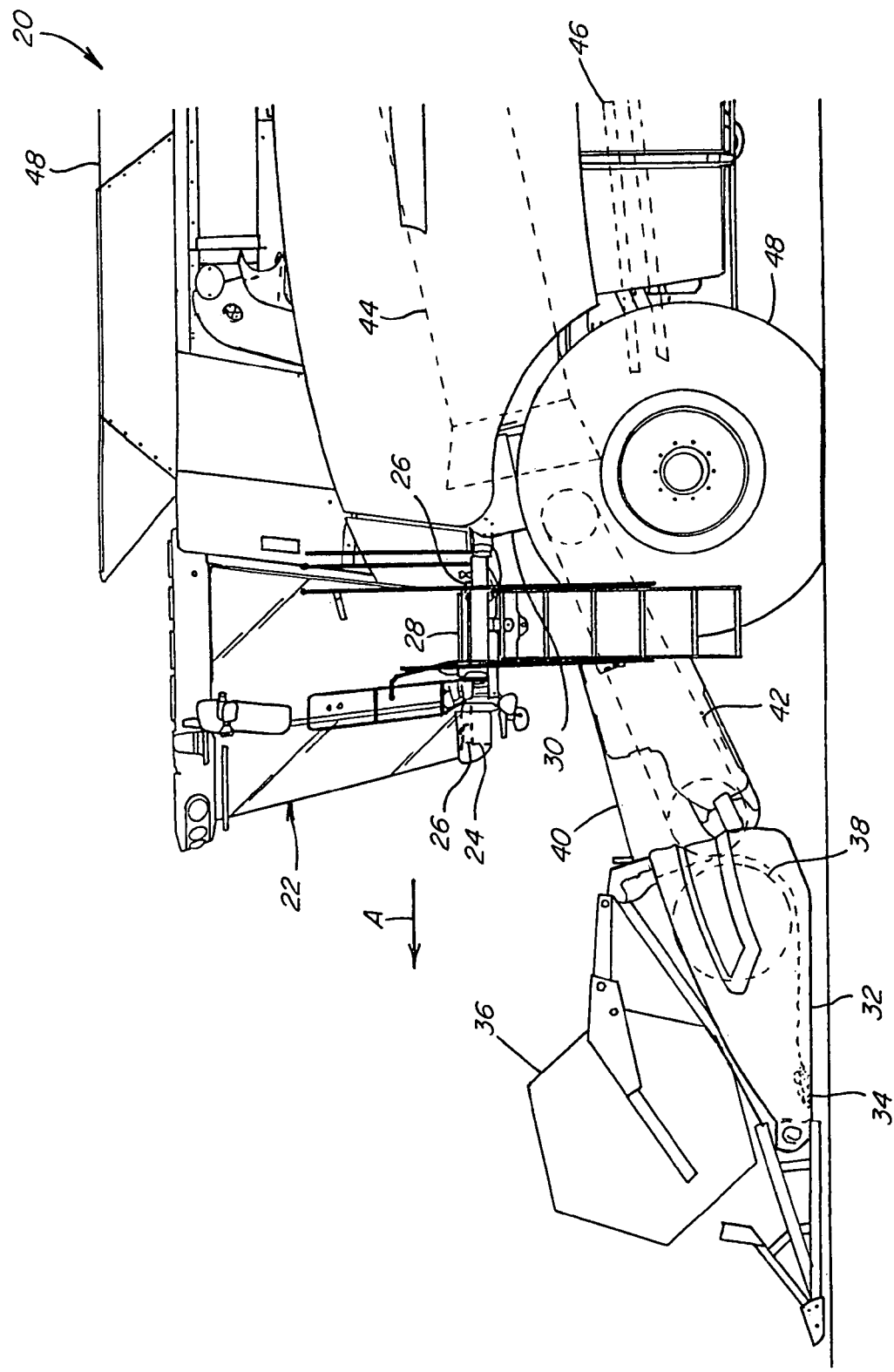
FIG. 1 is a side view of a representative work machine utilizing vibration isolators according to the invention, which work machine is an agricultural combine including a frame supporting a variety of systems which generate low frequency vibrations having horizontal components.
Figure 2:
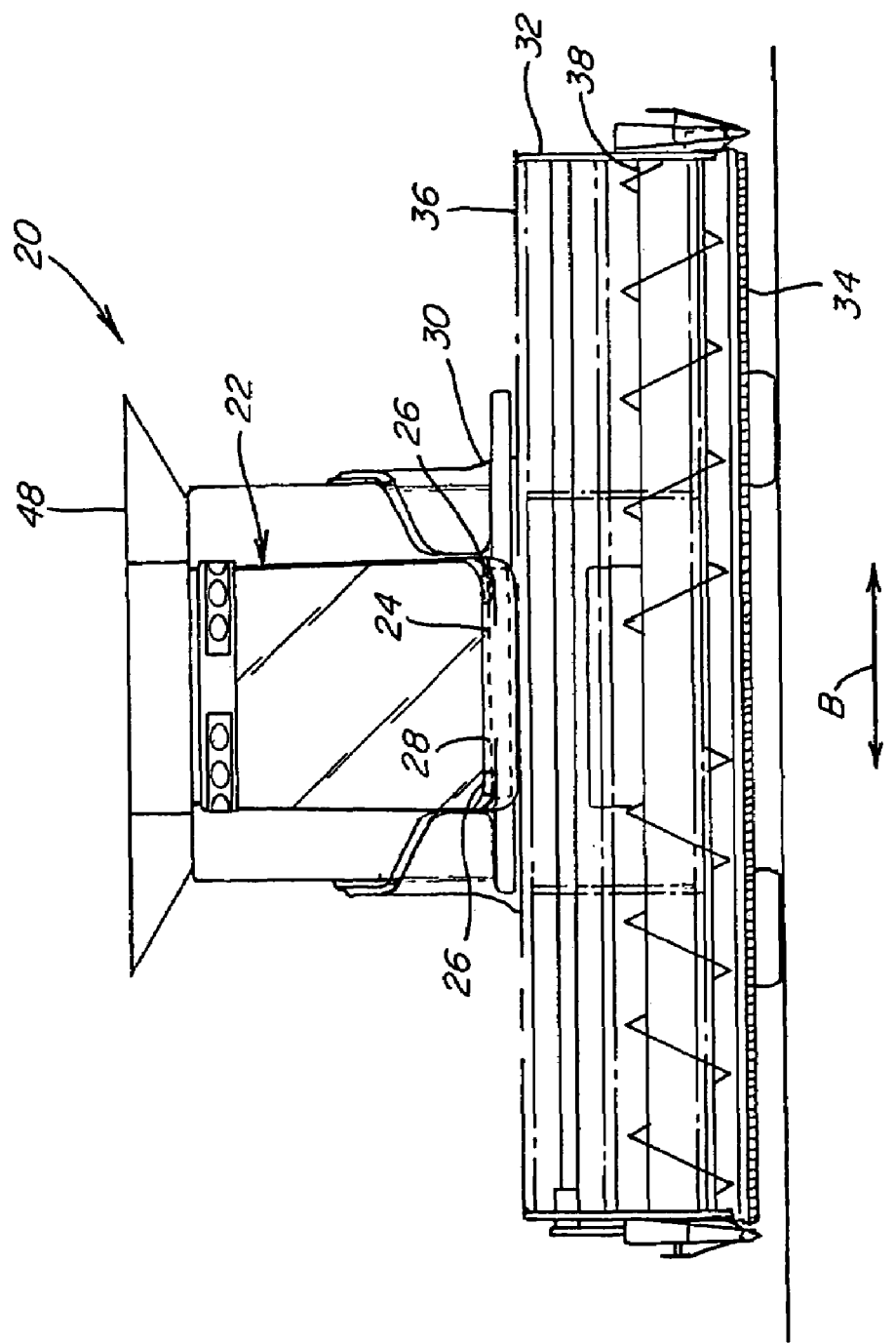
FIG. 2 is a simplified front view of the combine of FIG. 1.

Referring now to the drawings wherein like numbers refer to like items, in FIGS. 1, 2, 3, 9, 9A and 9B, a work machine which is a conventionally operable agricultural combine 20, is shown, including an operator cab 22 connected to and supported on a frame 24, by a plurality of four vibration isolators 26 constructed and operable according to the present invention, located beneath the four corners of cab 22, respectively, and generally hidden from view. Frame 24 is a structural element of combine 20 of sheet metal or other suitable construction, also largely hidden, which is connected to, and extends forwardly in cantilever relation from, a body 30 of combine 20. Vibration isolators 26 connect to a structural element of cab 22 which is preferably a floor 28, also of sheet metal or other suitable construction.

As is well known, combines such as represented by combine 20 are self propelled machines which are movable in a forward direction, denoted by arrow A in FIG. 1, for harvesting crops from agricultural fields. To accomplish this task, combine 20 includes an elongate, sidewardly extending header 32 on the front end thereof. Header 32 is a small grain header, and includes a sidewardly extending cutting knife or bar 34 on a forward lower end thereof, which includes an elongate sickle which is reciprocally sidewardly moved (double ended arrow B in FIG. 2) for severing crops from the ground as combine 20 moves forwardly thereover. Header 32 includes a rotating reel 36 extending the width thereof for facilitating the infeeding of the crop material onto a pan of header 32, and a rotating auger 38 including helical flights therearound for conveying the cut crops into an inlet of a feeder 40 which connects and supports header 32 on combine 20. Each of cutting bar 34, reel 36, and auger 38 is a source of vibration having a horizontal component.

Crops conveyed into feeder 40 are conveyed therein by a feed conveyor 42 upwardly and rearwardly into an inlet end of a threshing system 44 contained within body 30 of combine 20 and rotatably operable for separating grains from other elements of the crop material such as straw, stalks and pods. The separated grain then falls from the threshing system to a cleaning system 46 also contained in body 30, which includes sieves or shoes which reciprocate fore and aft for cleaning the grain. The clean grain is then conveyed by a clean grain conveyor (not illustrated) to a clean grain tank 48 which holds the grain until unloaded. Each of these systems is an additional source of vibration having a horizontal component. Such vibrations can include both fore and aft and side-to-side horizontal vibrations, vertical vibrations, pitch vibrations, roll vibrations, and yaw vibrations.

Additionally, combine 20 includes an engine and drive train (not shown) which power front drive wheels 48, for propelling the combine, which wheels 48 can include treads which also produce vibrations when rolled over a surface.

As noted in the Background Art section above, the various vibrations generated by the operation of a work machine, as exemplified by combine 20, can be transmitted throughout the structure of the combine, including to operator cab 22, and, more particularly, to an operator seat 50 (FIGS. 8 and 9) on which the operator is seated while operating the combine. This can result in increased operator annoyance, discomfort and fatigue, and therefore, is not desired. Vibrations found to be most undesired, and also most troublesome to reduce or eliminate tend to be lower frequency vibrations, for instance, in a range of up to about 100 Hz, particularly generally horizontal vectors or components of such vibrations, in both the fore and aft and sideward directions. These vibrations are often combinations, including variously of, vibrations emanating from the sideward reciprocating action of the cutting bar, the fore and aft reciprocations of the sieves of the cleaning system, tire tread contact with a surface over which the combine is moving, and imbalances of the rotating apparatus such as the rotor and the like. At the point of connection of cab 22 to frame 24, that is, in the vicinity of vibration isolators 26, the resulting generally horizontal components or vectors of these vibrations or vibratory movements of frame 24 can have amplitudes of several millimeters.

Vibration isolators 26 are designed to isolate cab 22 from the above described troublesome vibrations and vibratory movements of frame 24 at the point of connection therebetween, to improve operator and passenger comfort, and reduce fatigue. The isolation of such vibrations also reduces vibration caused degradation of equipment contained in and on cab 22.

Figure 3:
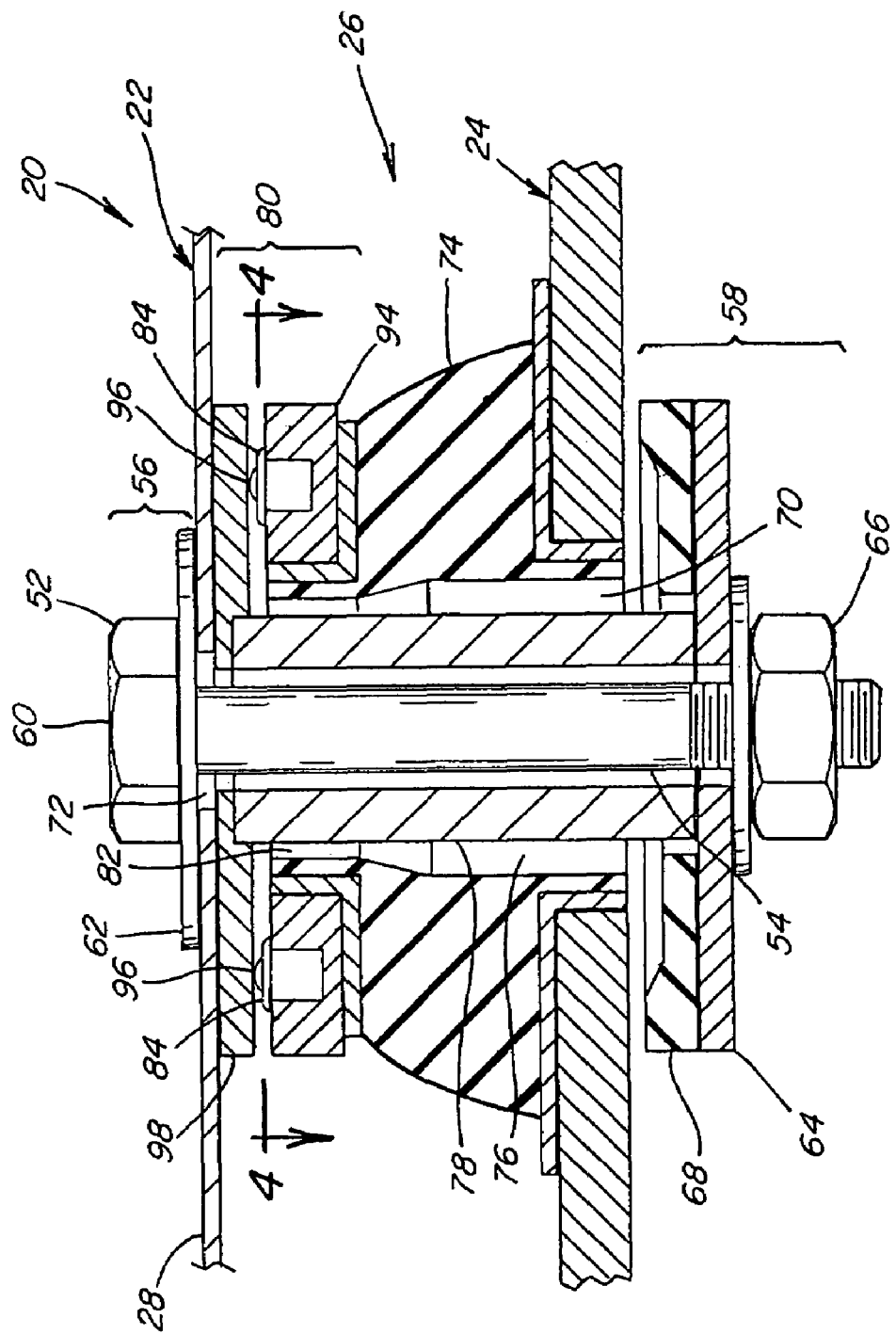
FIG. 3 is a sectional view of a representative vibration isolator of the invention, shown in connection with structural elements of the combine of FIGS. 1 and 2, including a portion of the frame of the combine and a floor of an operator cab of the combine.
Figure 4:
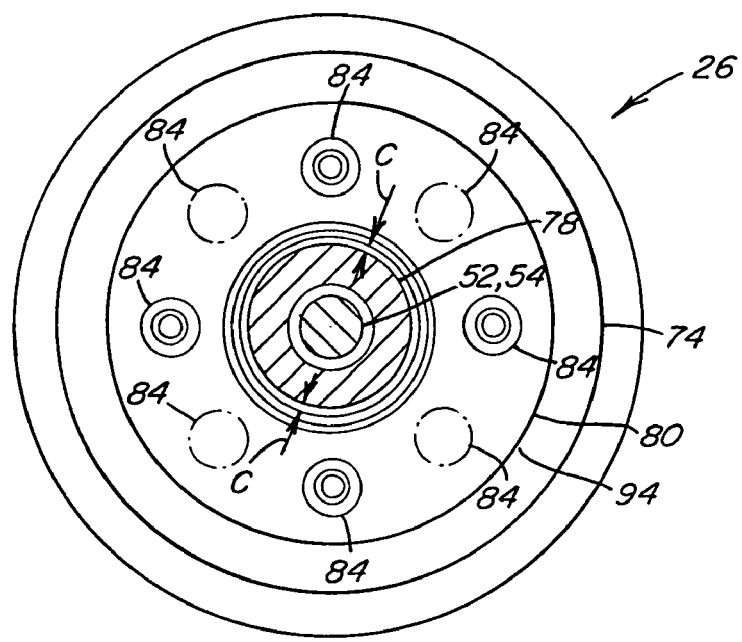
FIG. 4 is a top view of the representative vibration isolator, taken along line 4-4 of FIG. 3.
Figure 5:
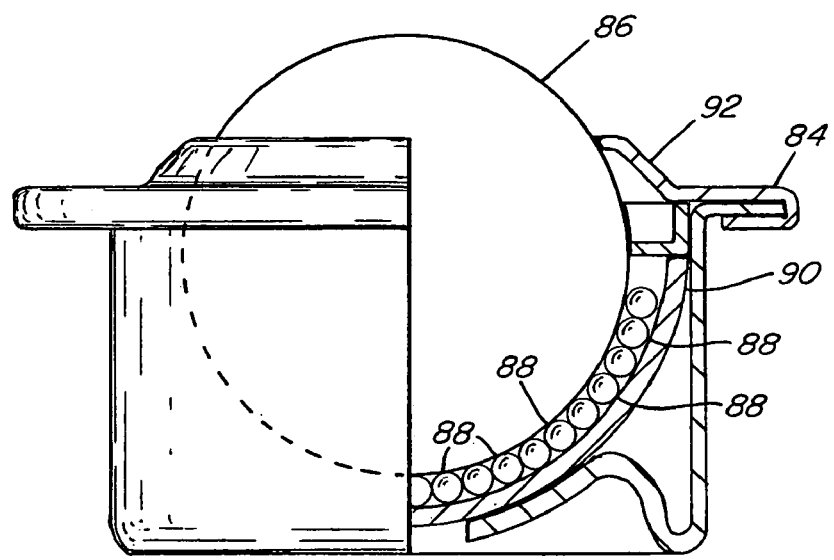
FIG. 5 is partial sectional view of a ball transfer unit of the vibration isolator of FIGS. 3 and 4.

Referring more particularly to FIGS. 3, 4 and 5, each of the vibration isolators 26 preferably includes a connector assembly 52 configured for extending in a predetermined direction for connecting two structural elements together, such as frame 24 and floor 28. Connector assembly 52 has at least one connector element 54 configured for extending in the predetermined direction between frame 24 and floor 28, and retainer elements 56 and 58 in connection with opposite end portions of connector element 54, cooperatively engageable with frame 24 and floor 28, respectively. Connector assembly 52 is configured for allowing relative movements of frame 24 and floor 28 in any direction generally perpendicular to the predetermined direction within a predetermined range of movement. Here, the predetermined direction is upwardly and downwardly or vertical, and thus the directions generally perpendicular thereto will be generally horizontal, so as to encompass the vibrations that are to be isolated.

For this application, a single connector element 54, which is preferably a common elongate bolt, including one end having an enlarged head 60, and an opposite threaded end, is used. Retainer element 56 preferably comprises head 60 of the bolt, and a common washer 62. Retainer element 58 preferably comprises a large washer 64, and a nut 66 threadedly engaged with the threaded end of the bolt. Retainer element 58 also includes a resilient cushioning washer 68, also retained by nut 66. Connector element 54 extends through vertically aligned holes 70 and 72 through frame 24 and floor 28, and is adjustably retained therein by the threaded positioning of nut 66 on element 54.

Each vibration isolator 26 preferably also includes a resilient element 74 retained between the opposite end portions of connector element 54, so as to be located between frame 24 and floor 28, in a position for cushioning and resiliently absorbing at least a portion of any vibrations or shock loads exerted in the predetermined or generally vertical direction. For this application, resilient element 74 can be of a rubbery or resiliently yieldable polymeric material, as is commonly used for shock absorption, the composition and natural frequency of which can be tailored for particular loading and other conditions of an application.

Further, connector 54 extends through a hole 76 through a central region of resilient element 74, and element 74 preferably extends at least partially into one or both of holes 70 and 72 through frame 24 and floor 28, so as to provide cushioning of shocks exerted between the edges thereof and connector element 54, if brought into contact.

Here, connector assembly 52 is shown additionally including a tubular spacer 78 extending around connector element 54 and through hole 76 through resilient element 74, which allows a predetermined amount of endplay of the connector element 54, to reduce possible occurrences of transmissions thereby of vibrations and shock loads between frame 24 and floor 28, and to ensure that nut 66 is not tightened to such an extent as to inhibit or reduce vibration isolation properties of isolator 26. Tubular spacer 78 additionally preferably has a predetermined sectional or horizontal extent, at least where it passes through hole 76 through resilient element 74 and hole 70, which is smaller than a horizontal extent of the hole 76 through which it passes, to allow at least substantially free relative horizontal movements of connector assembly 52 and resilient element 74.

Vibration isolator 26 further includes at least one bearing element or a bearing assembly 80 disposed between the opposite end portions of connector element 54, and configured for bearing or carrying loads exerted in the predetermined vertical direction, while allowing substantially free relative movements, including linear movements, of frame 24 and floor 28 connected together by connector assembly 52, in substantially any directions generally perpendicular to the predetermined direction, that is, in any generally horizontal direction, such that horizontal components or vectors of vibrations and vibratory movements of each of frame 24 and floor 28, and particularly frame 24, are isolated and not significantly transferred to the other. Such allowed free movement, importantly, is only limited by the amount or range of relative horizontal movement allowed between frame 24 and floor 28, which is dictated or controlled by the amount of freedom of movement allowed by connector assembly 52.

Here, connector element 54 and tubular spacer 78 of assembly 52 pass through a passage 82 through bearing assembly 80 and resilient element 74, which has a sectional extent which is a predetermined amount greater than the sectional extent of spacer 78 at that location (denoted by sets of opposing arrows C in FIG. 4), which determines and defines a predetermined range of free horizontal movement therebetween in any horizontal direction, and thus, also between frame 24 and floor 28. That is, frame 24 will be allowed to move in any horizontal direction relative to floor 28, by an amount up to a sum of the distances between sets of arrows C, in any horizontal direction, which sum, in the preferred embodiment for the present application, is equal to about 15 millimeters. As noted above, this value is selected as many annoying and discomforting vibratory movements of work machines such as agricultural harvesting machines such as combine 20, as well as tractors and the like, have been found to have horizontal components or vectors having amplitudes of less than about 15 millimeters. It should be understood though, that this selected value is not intended to be limiting, and that other values may be selected as desired or required for a particular application.

A preferred bearing assembly 80 of the present invention includes a plurality of ball transfer units 84, for instance, three or more, such as the eight illustrated, which can be, for instance, well-known, commercially available ball transfer units such as available worldwide from SKF Group. Such ball transfer units 84 are preferably arranged in an array extending around the central region of isolator 26. Each ball transfer unit 84 includes a larger central ball bearing 86 of a first diametrical extent supported by a plurality of ball bearings 88 of a second diametrical extent smaller than the first diametrical extent, contained in a partial spherical shaped retainer or race 90 by a retainer flange 92. This provides a low frictional resistance to rolling movements of the larger ball bearing 86. The array of ball transfer units 84 are supported in the array on a large bearing flange 94, which, in turn, is supported on resilient element 74, so as to extend around connector element 54. The larger ball bearings 86 of the array of ball transfer units 84 are disposed in a load bearing position defining a preferably substantially planar contact interface 96 with a flat plate bearing 98 disposed between the ball bearings 86 and floor 28, along or over which the substantially free relative movements of frame 24 and floor 28 sought for isolating horizontal components of vibrations and vibratory movements of frame 24, is allowed, as limited by the range of movement established by connector assembly 52.

Figure 6:
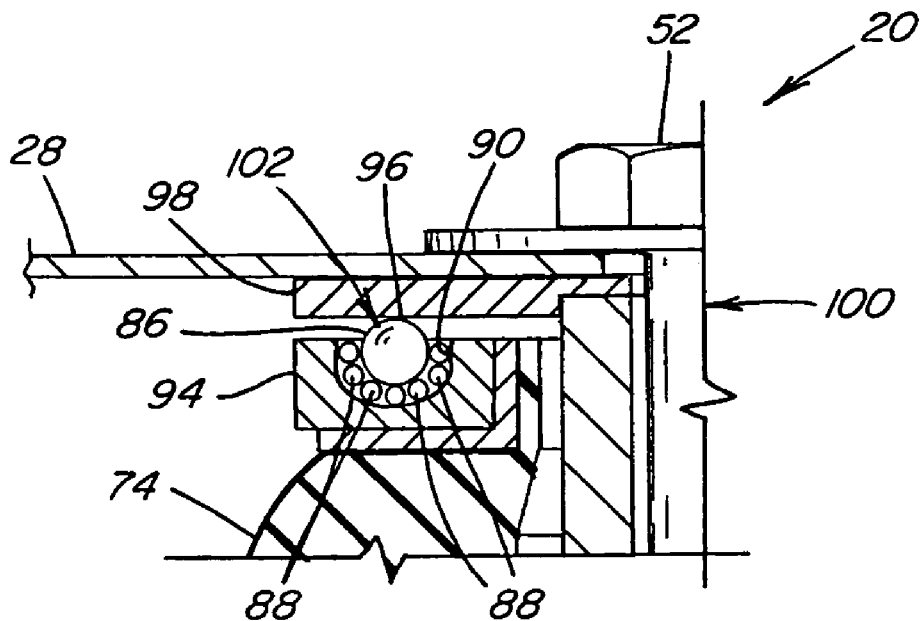
FIG. 6 is a fragmentary sectional view of an alternative vibration isolator of the invention, shown in connection with the floor of the operator cab of the combine of FIGS. 1 and 2.

Referring also to FIG. 6, an alternative vibration isolator 100 constructed and operable according to the teachings of the present invention, is shown, like parts of isolator 100 and isolator 26 being identified by like numbers. Vibration isolator 100 includes a connector assembly 52 connecting floor 28 to the frame of combine 20, a resilient element 74, but a flange 94 which incorporates an array of at least three ball transfer units 102 therein extending around connector assembly 52. Like ball transfer units 84, each ball transfer unit 102 includes a larger central ball bearing 86 of a first diametrical extent supported by a plurality of ball bearings 88 of a second diametrical extent smaller than the first diametrical extent, but these are contained in a partial spherical shaped retainer or race 90 formed directly in flange 94. The larger ball bearings 86 of the array of ball transfer units 102 are disposed in a load bearing position defining a preferably substantially planar contact interface 96 with a flat plate bearing 98 disposed between the ball bearings 86 and floor 28, along or over which the substantially free relative movements of frame 24 and floor 28 sought for isolating horizontal components of vibrations and vibratory movements of frame 24, are allowed, as limited by the range of movement established by connector assembly 52.

Figure 7:
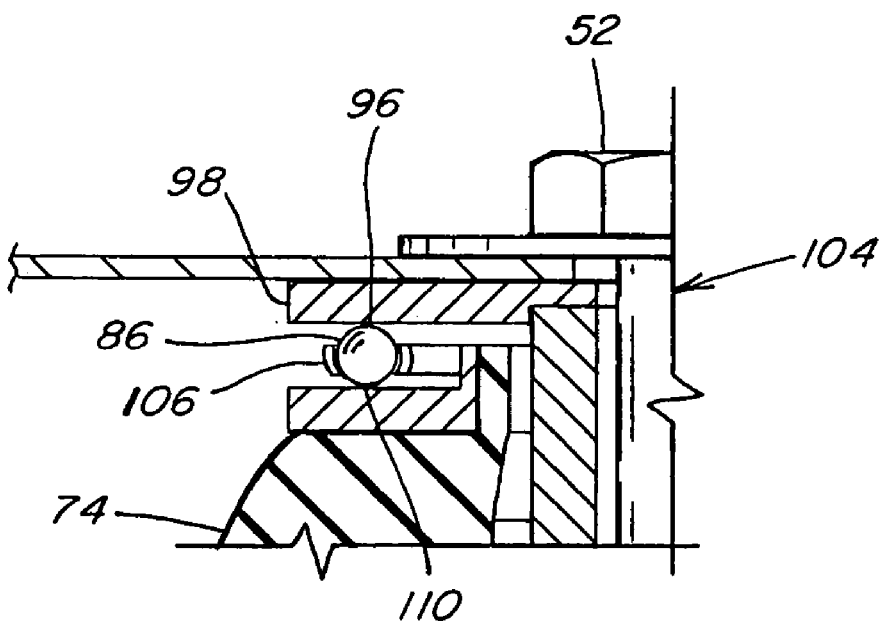
FIG. 7 is a fragmentary sectional view of another alternative vibration isolator of the invention, also shown in connection with the floor of the operator cab of the combine of FIGS. 1 and 2.

Referring also to FIG. 7, another alternative vibration isolator 104 constructed and operable according to the teachings of the present invention, is shown, like parts of isolator 104 and isolators 100 and 26 being identified by like numbers. Vibration isolator 104 includes a connector assembly 52 connecting floor 28 to the frame of combine 20, and a resilient element 74, but instead of ball transfer units, it utilizes an array of ball bearings 86 retained by a retainer 106 around connector assembly 52 and collectively rollable in any direction between and along a lower plate bearing 108 and plate bearing 98. Again, ball bearings 86 of the array are disposed in a load bearing position defining a preferably substantially planar contact interface 96 with plate bearing 98 disposed between the ball bearings 86 and floor 28, and also a second contact interface 110 with plate bearing 108, along or over which the substantially free relative movements of frame 24 and floor 28 sought for isolating horizontal components of vibrations and vibratory movements of frame 24, are allowed, as limited by the range of movement established by connector assembly 52, as discussed above.

Figure 8:
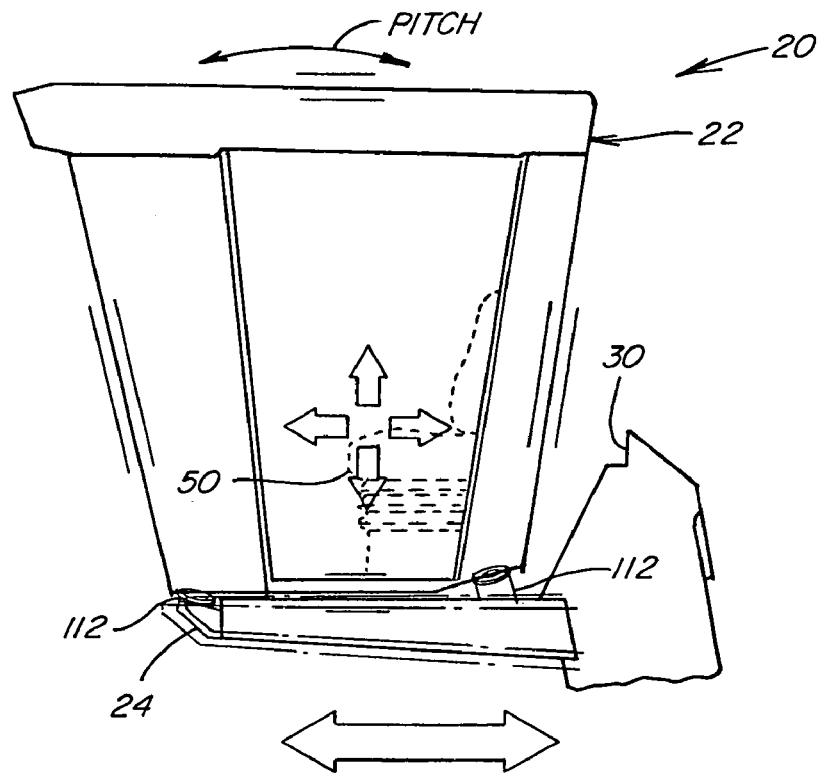
FIG. 8 is a simplified schematic side representation of the operator cab of the combine of FIGS. 1 and 2 supported on the frame of the combine by prior art mounts, and illustrating vibratory movements of the cab and frame.
Figure 8A:
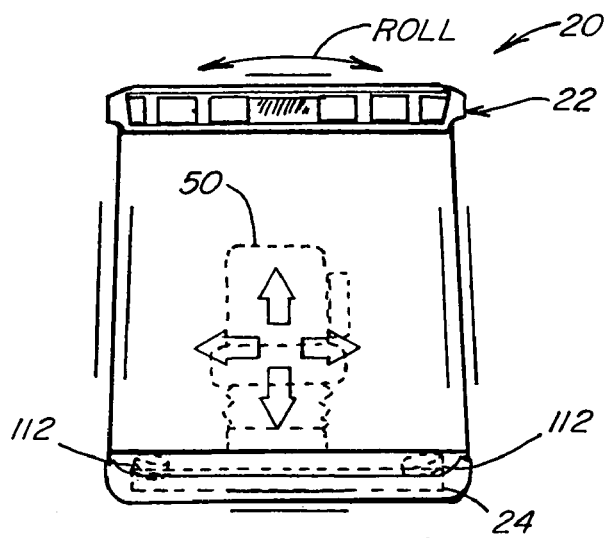
FIG. 8A is a simplified schematic front view of the operator cab supported on the frame of the combine by the prior art mounts, and illustrating the vibratory movements of the cab and frame, including side-to-side movements.
Figure 8B:
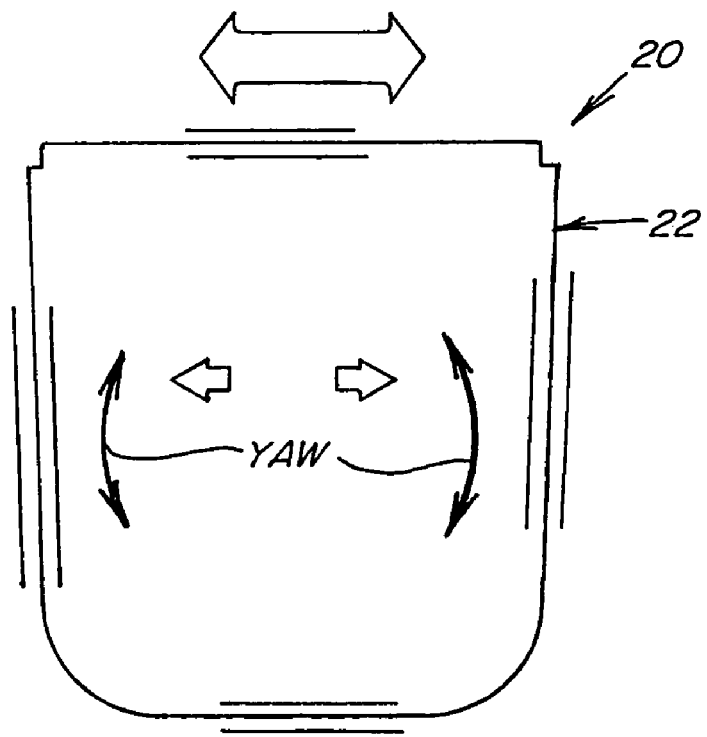
FIG. 8B is a simplified schematic top view of the cab mounted by the prior art mounts, illustrating the resultant vibratory movements thereof.

Referring also to FIGS. 8, 8A, 8B, 9, 9A and 9B, in FIGS. 8, 8A and 8B, cab 22 of combine 20 is shown supported on frame 24 by prior art resilient rubbery material mounts 112. The mounts 112 are directed generally toward a center of gravity of cab 22, and frame 24 is subjected to normal vibrations, including fore and aft vibrations, side-to-side vibrations, and vertical vibrations (all denoted by large white arrows), as well as pitch vibrations, yaw vibrations, and roll vibrations (identified by smaller curved arrows), resulting from operation of various systems of combine 20 as outlined above. Fore and aft, side-to-side, pitch, roll and yaw vibrations will have horizontal vectors or components of movement. Operator seat 50 is shown within the interior of cab 22, and is subject to corresponding vibrations, as illustrated by the smaller arrows. It should be noted that the smaller white arrows include upwardly extending and downwardly extending arrows, which denote vertical vibratory movements of cab 22, and seat 50, and which can also represent the vertical vectors or components of pitch, yaw and/or roll actions, and also vertical vibratory movements which can result from the horizontal vibrations of frame 24, denoted by the large double-ended arrow, which are transmitted through mounts 112 to cab 22. Resultant vibratory movements of the various surfaces of cab 22 are illustrated by double lines. Briefly addressing the upward and downward vibratory movements of cab 22 and seat 50 that can result from generally horizontal vibratory movements of frame 24, it has been concluded that the cantilever mounting arrangement of frame 24 on body 30 of combine 20, in combination with the offset location of the center of gravity of cab 22 above frame 24, causes translation of generally horizontal vibratory movements of the cantilever frame 22 and cab 24 into upward and downward movements.

Figure 9B:
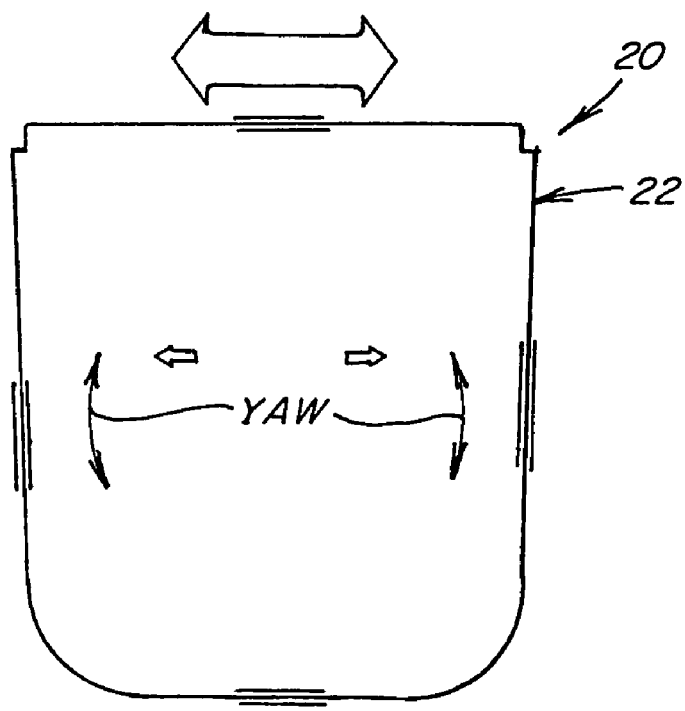
FIG. 9B is a simplified schematic top view of the cab illustrating the resultant reduced vibratory movements resulting from the invention.
Figure 9:
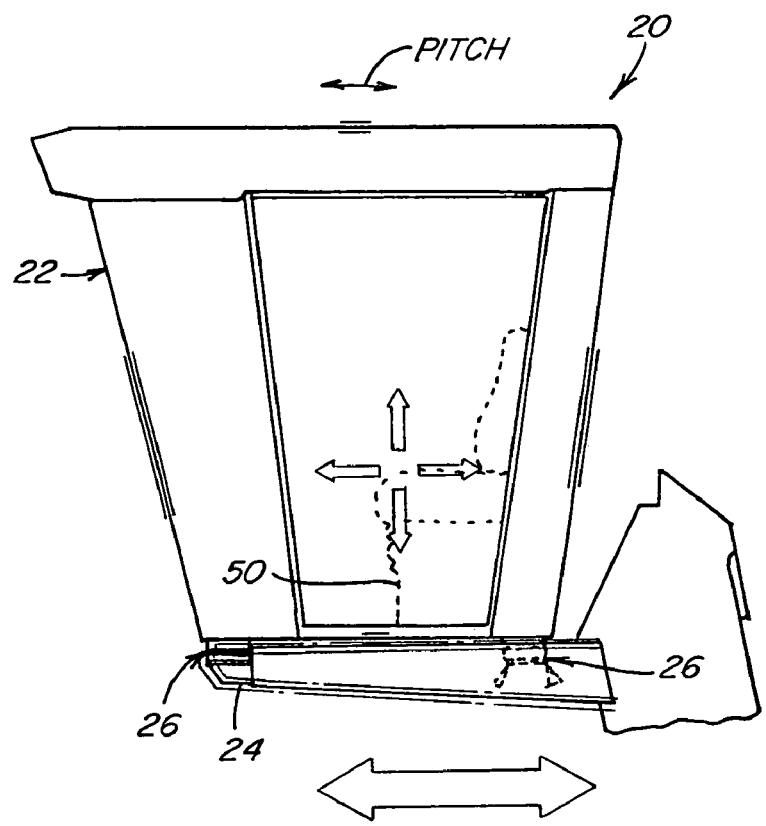
FIG. 9 is a simplified schematic side view of the cab, shown supported on the frame by vibration isolators of the present invention, and illustrating resultant reduced vibratory movements thereof.
Figure 9A:
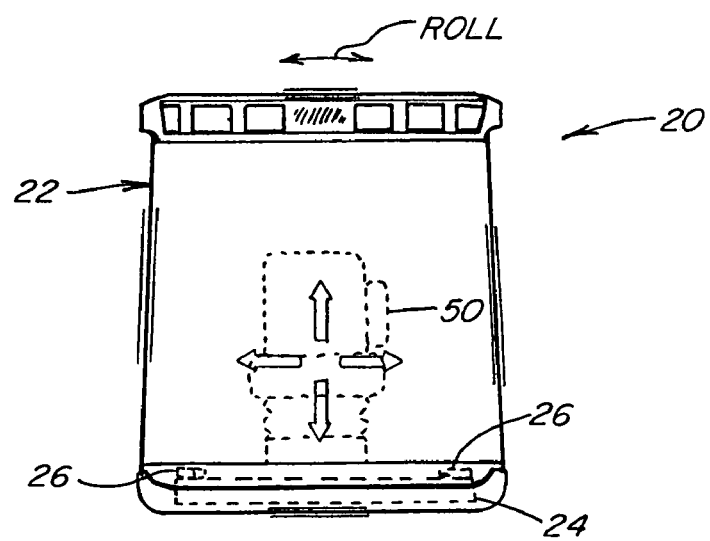
FIG. 9A is a simplified schematic front view of the cab, supported on the frame by the vibration isolators of the present invention, and illustrating the resultant reduced vibratory movements thereof, including the side-to-side movements.

FIGS. 9, 9A and 9B illustrate cab 22 supported on frame 24 of combine 20 by the plurality of vibration isolators 26 discussed in detail above. As illustrated by the smaller double lines in association with the surfaces of cab 22, and the smaller arrows in association with seat 50, it is evident that the vibratory movements of frame 24 are much better isolated, such that resulting vibrations and vibratory movements of cab 22 and seat 50 are significantly reduced.

Figure 10:
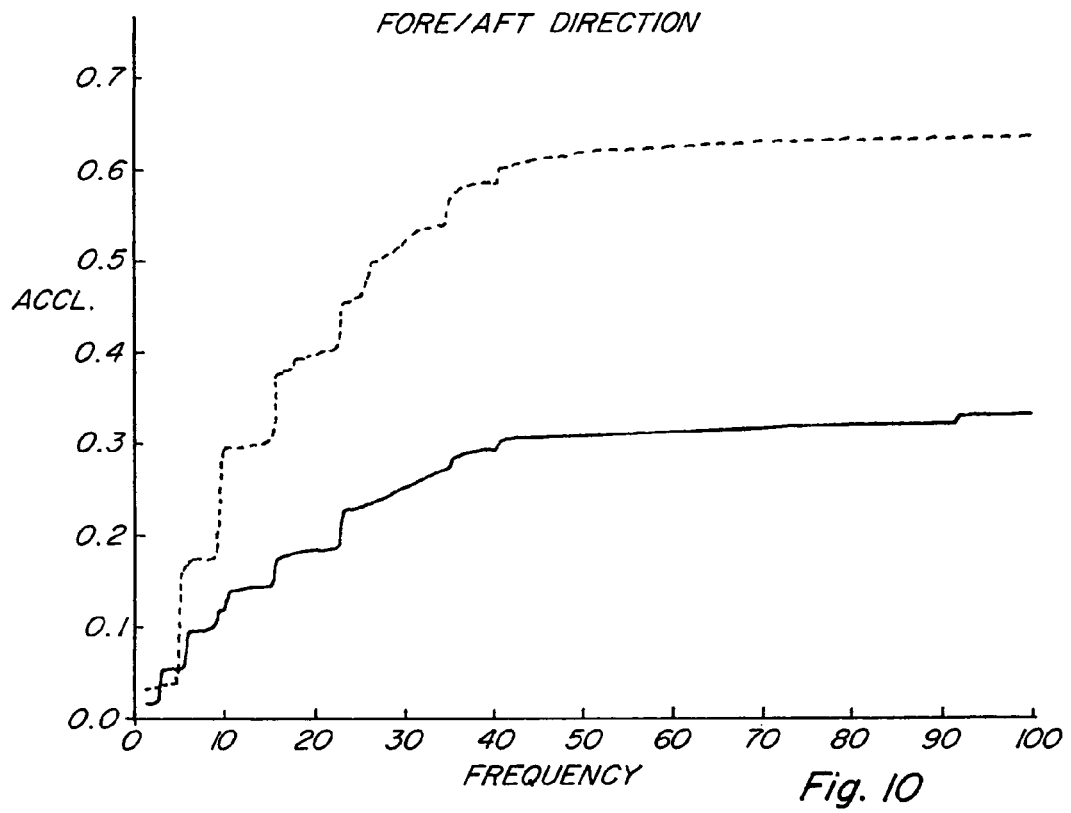
FIG. 10 is a graphical representation showing traces of measured acceleration in the fore/aft direction of an operator seat of the cab of the combine of FIGS. 1 and 2 when supported on the vibration isolators of the invention and the prior art mounts of FIG. 8.
Figure 11:
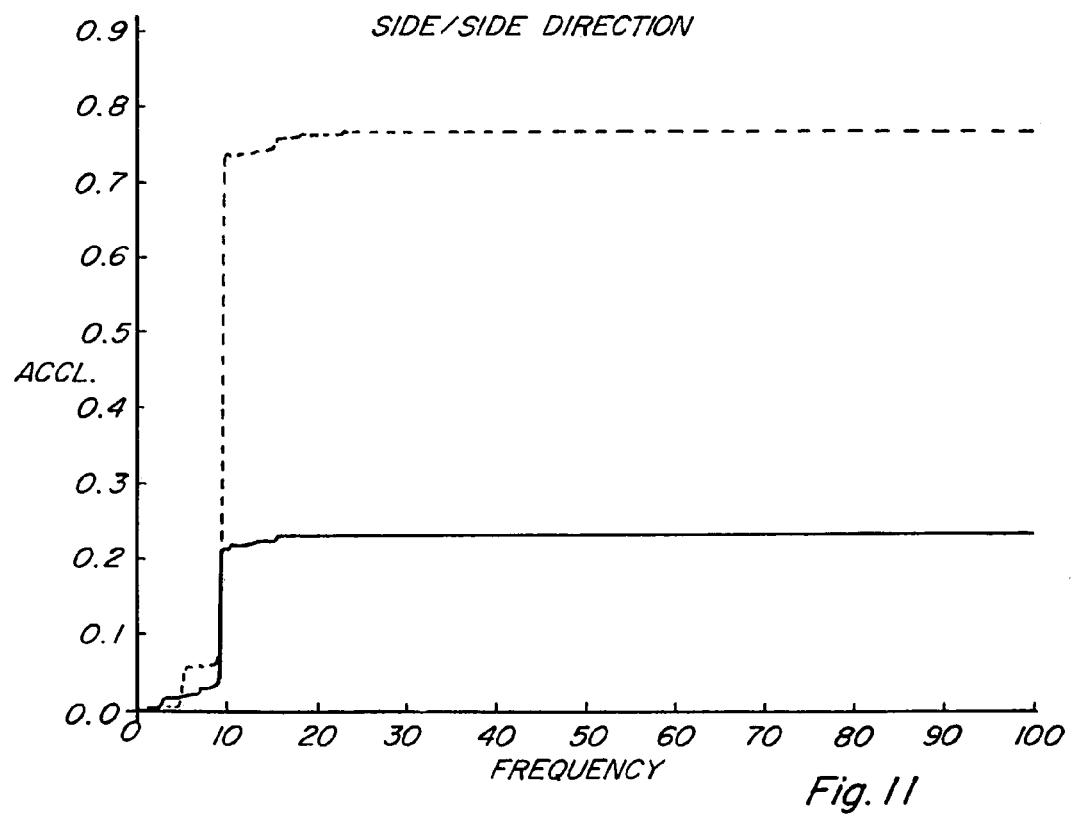
FIG. 11 is another graphical representation showing traces of measured acceleration in the side-to-side direction of an operator seat of the cab of the combine of FIGS. 1 and 2 when supported on the vibration isolators of the invention and the prior art mounts of FIG. 8.
Figure 12:
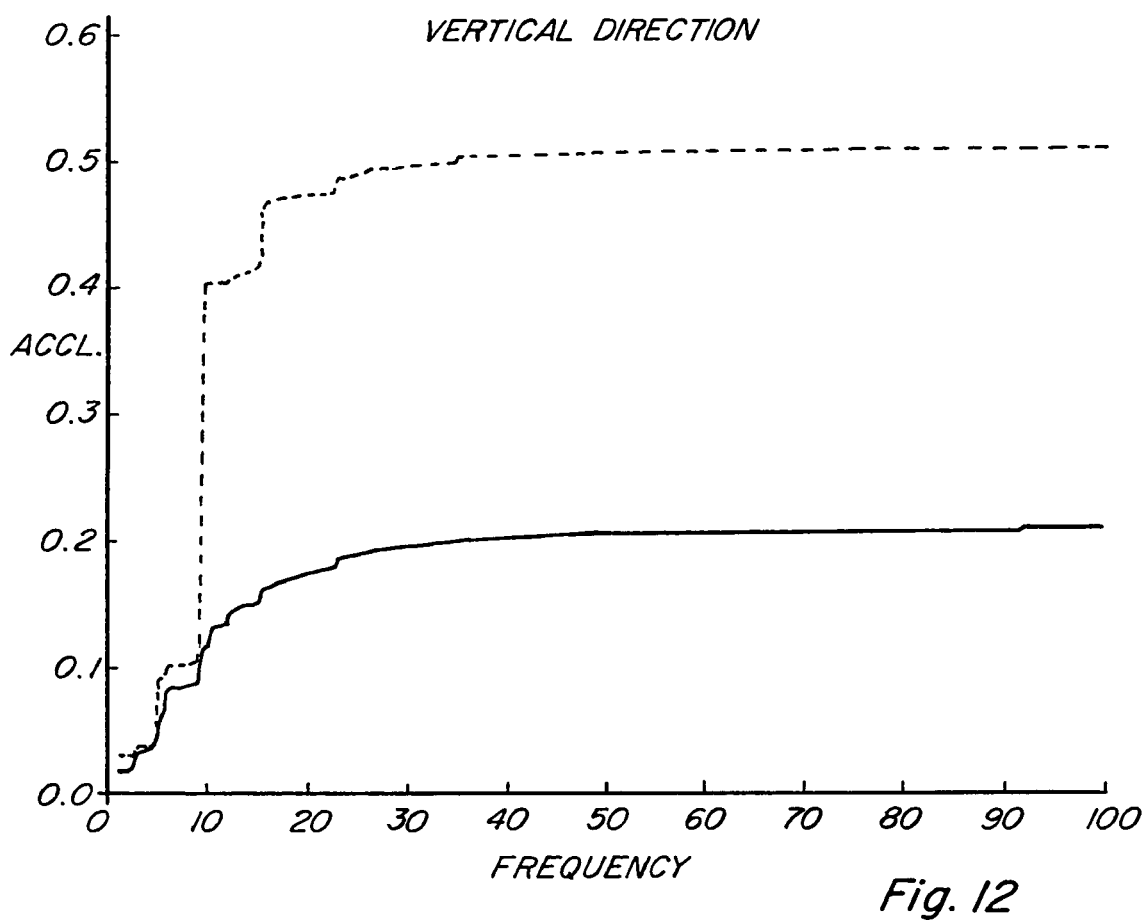
FIG. 12 is still another graphical representation showing traces of measured acceleration in the vertical direction of an operator seat of the cab of the combine of FIGS. 1 and 2 when supported on the vibration isolators of the invention and the prior art mounts of FIG. 8.

Referring also to FIGS. 10, 11 and 12, traces of measured vibrations transmitted to seat 50 in cab 22 resulting from vibrations from frame 24 of combine 20, during normal operation of the above identified systems of the combine, are shown. In the graphical representations of FIGS. 10, 11 and 12, the horizontal axis represents frequency in hertz (Hz), and the vertical axis represents acceleration of seat 50 (rms value in meters/second$^2$). The traces of seat acceleration versus frequency for the mounting arrangement illustrated in FIGS. 8, 8A and 8B using mounts 112 are denoted by dotted lines, whereas the traces for the mounting arrangement illustrated in FIGS. 9, 9A and 9B using vibration isolators 26 are denoted by solid lines. In FIG. 10, the traces are of fore and aft measured vibrations of seat 50. In FIG. 11, the traces are of side-to-side measured vibrations. In FIG. 12, the traces are of up and down or vertical measured vibrations.

As is evident by an examination of FIG. 10, measured fore and aft vibrations of the seat are significantly greater for the mounting arrangement illustrated in FIGS. 8, 8A and 8B, compared to that of the invention illustrated in FIGS. 9, 9A and 9B, throughout the frequency range of from zero to about 100 Hz. Similarly, the vibrations of the seat in the side-to-side direction as illustrated in FIG. 11, show that vibrations of the arrangement in FIGS. 8, 8A and 8B are again significantly greater than those of the arrangement of the invention illustrated in FIGS. 9, 9A and 9B, also throughout most of the zero to 100 Hz frequency range. Still further, examining FIG. 12, it is apparent that the upward and downward vibrations of the seat are significantly greater for the arrangement of FIGS. 8, 8A and 8B versus the arrangement of the invention of FIGS. 9, 9A and 9B, again through the bulk of the zero to 100 Hz frequency range.

As a special note in reference to the traces of FIG. 12, it is noted that it is believed that by isolating or reducing the transmission of vibrations and vibratory movements in the horizontal plane to cab 22, as a result of the use of vibration isolators 26 in mounting cab 22 to frame 24, the upward and downward movements of cab 22 resulting from the cantilever mounting arrangement can be significantly reduced, as is evident by a comparison of the two traces.

Figure 13:
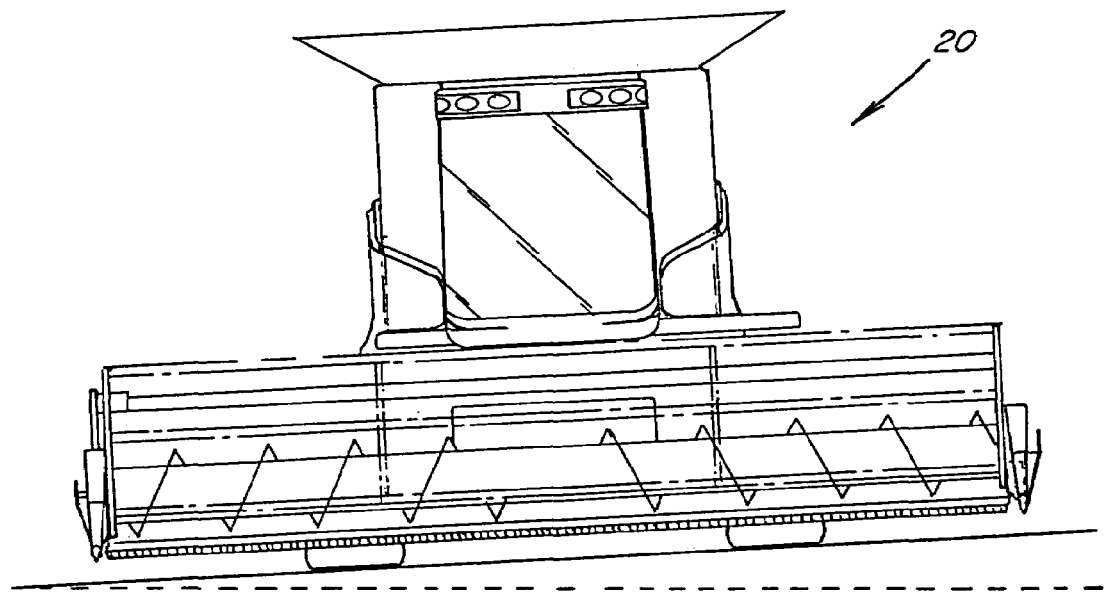
FIG. 13 is another simplified front view of the combine of FIG. 1, shown oriented at a small side incline.
Figure 14:
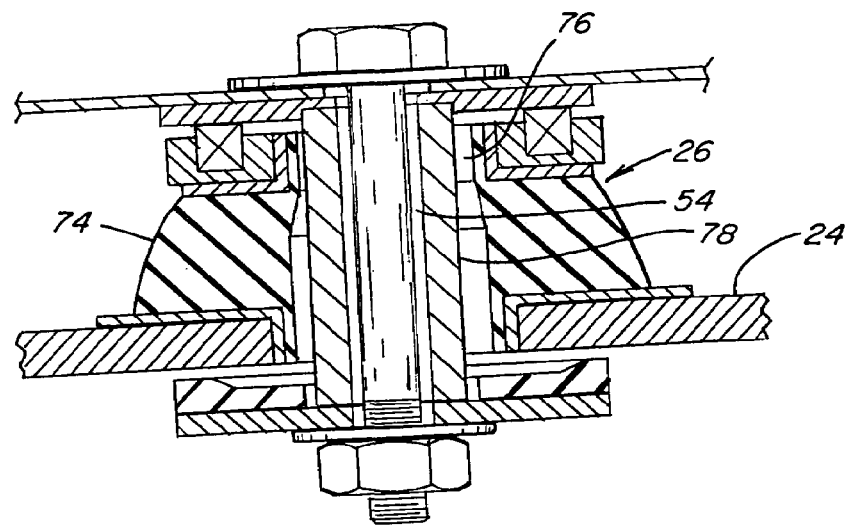
FIG. 14 is another sectional view of the vibration isolator of the invention, shown in connection with the structural elements of the combine oriented as shown in FIG. 13, so as to illustrate operation of the vibration isolator under inclined conditions.

Referring also to FIGS. 13 and 14, it should also be noted that it has been found that even when combine 20 is located on or moving over a side hill, so as to be tilted to one side or the other such as illustrated, or is moving up a grade or down a grade, vibration transmissions are still significantly reduced, as connector assembly 52 of the vibration isolators of the invention, represented by isolator 26, has not been found to move fully to one side or the other within the range of movement allowed by the differences in the sideward extent of hole 76 and spacer 78, as denoted by arrows C in FIG. 4, as the energy of the vibration of frame 24 tends to somewhat center spacer 78 and connector element 54 within the range of movement thereof within hole 76. This is believed to be another benefit and advantage of the vibration isolators of the invention, as embodied in vibration isolators 26, 100 and 104.

Figure 15:
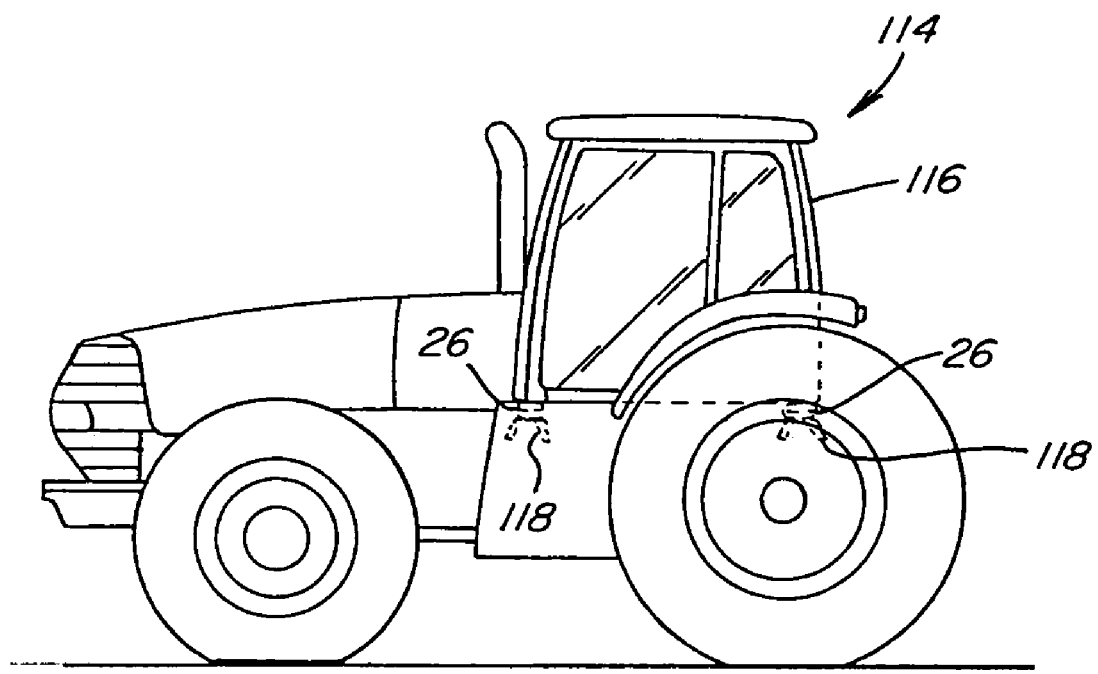
FIG. 15 is a simplified side view of a tractor, showing an operator cab thereof mounted on a frame thereof by vibration isolators of the invention.

As noted above, the vibration isolators of the present invention, as explained in detail herein, are also contemplated to have utility for a wide variety of applications. In this regard, FIG. 15 illustrates another representative application for the vibration isolators of the present invention, which can include vibration isolators 26 illustrated, or vibration isolators 100 or 104. FIG. 15 illustrates a conventional tractor 114 which can be used for a variety of purposes, including, but not limited to, agricultural, construction, earthmoving, and mining applications, including an operator cab 116 disposed on structural elements 118, which can be structural ribs or the like. Vibration isolators 26 of the invention are shown supporting cab 116 on structural elements 118, to provide many of the advantages and benefits discussed hereinabove, particularly isolation from vibrations and vibratory movements transmitted to structural elements 118 from the various systems and functions of tractor 114.

Figure 16:
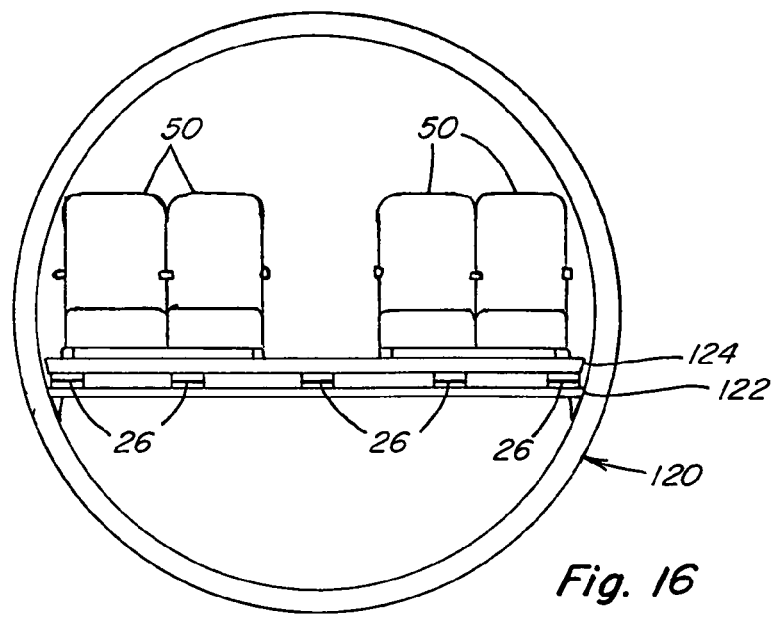
FIG. 16 is a simplified sectional view of an aircraft fuselage, showing a passenger cabin including seats disposed on a platform supported by vibration isolators of the invention.

Referring to FIG. 16, a sectional view of a representative aircraft fuselage 120 is shown, including a structural element 122 spanning an interior cavity thereof. Another structural element 124, which can be a passenger or cargo platform, is illustrated above structural element 122. And, a plurality of vibration isolators 26 are illustrated connected between structural elements 122 and 124 in the above-described manner, for supporting structural element 124 on structural element 122, while isolating structural element 124 from vibrations of structural element 122. Here, a plurality of passenger seats 50 are illustrated in connection with structural element 124.

Figure 17:
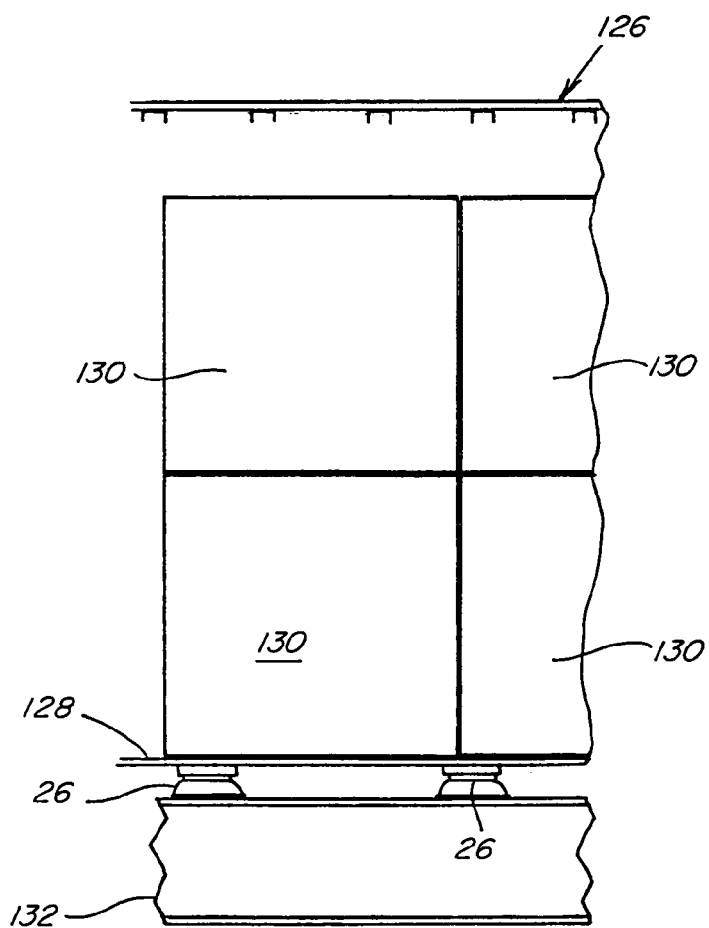
FIG. 17 is a simplified fragmentary sectional view of an over-the-road trailer, illustrating vibration isolators of the invention supporting a cargo floor of the trailer and cargo thereon.

Also referring to FIG. 17, a conventional over-the-road truck trailer 126 is shown, including a freight floor 128 and cargo 130 shown supported on a structural element 132 of trailer 126, using a plurality of vibration isolators 26 of the invention.

Figure 18:
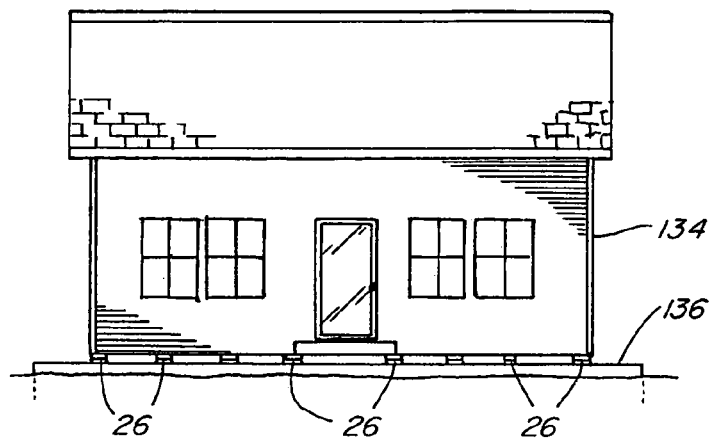
FIG. 18 is a side view of a building supported by vibration isolators of the invention on a foundation.

Referring to FIG. 18, a side view of a building 134 is shown, supported on a foundation 136, by a plurality of vibration isolators of the invention. Vibration isolators 26 will isolate building 134 from vibrations of foundation 136, and also foundation 136 from vibrations of building 134.

Figure 19:
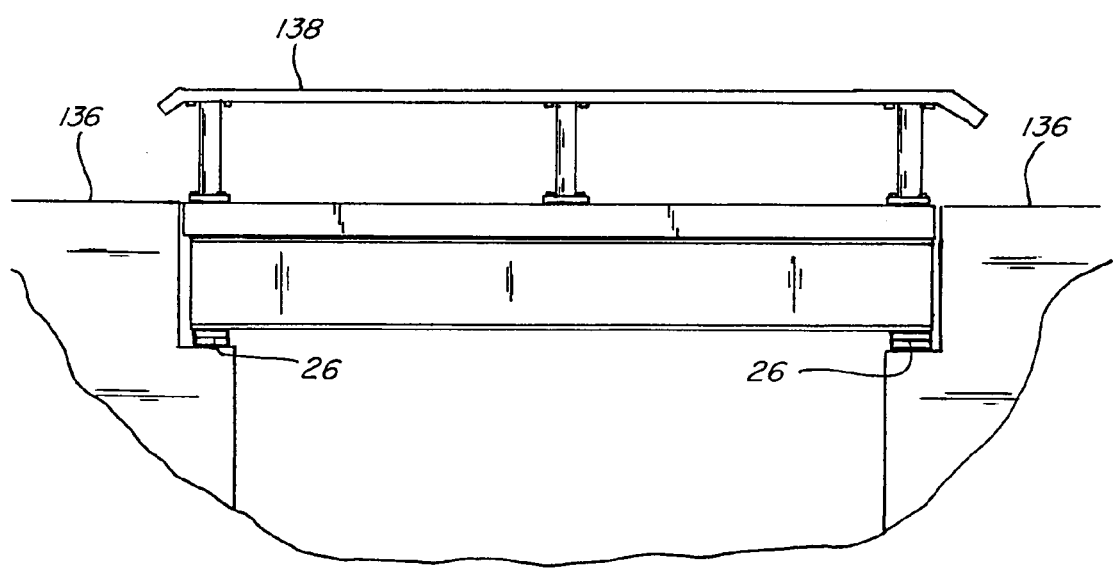
FIG. 19 is a side view of a bridge supported by vibration isolators of the invention on foundations.

FIG. 19 illustrates a bridge 138 supported on either end on foundations 136, by isolators 26 of the invention, for isolating the bridge from vibrations of the foundations, and vice versa.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. A work machine comprising:
a frame;
apparatus in connection with the frame and operable for generating vibrations of the frame;
a support structure configured for supporting at least one person thereron;
at least one vibration isolator supporting the support structure on the frame, the vibration isolator including at least one bearing element disposed in supporting contact with the support structure along an at least generally planar contact interface, the at least one bearing element allowing substantially free relative movements of the frame and the support structure in substantially any direction along the contact interface so as to reduce any transmissions of vibrations of the frame to the support structure along the contact interface, and the vibration isolator including a connector element connecting the support structure to the frame configured for allowing a predetermined amount of relative movement therebetween in a direction generally perpendicular to the contact interface and for limiting relative movements of the support structure and the frame along the contact interface to a predetermined range, wherein the at least one vibration isolator additionally includes at least one resiliently yieldable elastomeric element supporting the at least one bearing element, wherein the connector element extends between the support structure and the frame through a passage through the resiliently yieldable elastomeric element and the at least one bearing element, wherein the passage has a first extent in the direction generally perpendicular to the contact interface; and
a tubular spacer extending around the connector element and through the passage through the at least one resiliently yieldable elastomeric element, the tubular spacer has a second extent in the direction generally perpendicular to the contact interface, wherein the second extent is smaller than the first extent to define a non-contacting space between the elastomeric element and the tubular spacer when the connector element is in a centered position within the passage, the non-contacting space extending substantially along the length of the connector element, thereby providing the predetermined amount of relative movement of the connector element and the at least one resiliently yieldable elastomeric element in the direction generally perpendicular to the contact interface within the predetermined range.

2. The work machine of claim 1, wherein the predetermined range has a maximum extent of about 15 millimeters.

3. The work machine of claim 1, wherein the resiliently yieldable elastomeric element includes a portion disposed between the connector element and the at least one bearing element for limiting relative movements of the support structure and the frame along the contact interface to the predetermined range.

4. The work machine of claim 1, wherein the at least one bearing element comprises a plurality of ball transfer units.

5. The work machine of claim 4, wherein at least one of the ball transfer units comprises a ball bearing of a first diametrical extent supported by a plurality of ball bearings of a second diametrical extent smaller than the first diametrical extent.

6. The work machine of claim 1, comprising a plurality of the bearing elements arranged in an array around the connector element.

7. The work machine of claim 1, wherein the connector element comprises a first threaded member extending through the passage through the support element and the frame, and a second threaded member threadedly engaged with the first threaded member and adjustably positionable thereon for adjusting the predetermined amount of relative movement allowed between the frame and the support member in the direction generally perpendicular to the contact interface.

8. The work machine of claim 1, wherein the support structure comprises an operator cab.

9. The work machine of claim 1, wherein the support structure comprises a seat.

10. The work machine of claim 1, wherein the support structure includes a floor and the contact interface iS at least generally parallel to the floor.

11. The work machine of claim 1, wherein the work machine comprises an agricultural combine and the support structure comprises a floor supporting an operator seat of the combine.

12. The work machine of claim 1, wherein the at least one bearing element comprises a plurality of ball bearings retained so as to extend in an array around the connector element.

13. A vibration isolator, comprising:
 a connector assembly configured for extending in a predetermined direction for connecting two structural elements together, the connector assembly having at least one connector element configured for extending in the predetermined direction between structural elements connected together by the connector assembly, and retainer elements in connection with opposite end portions of the at least one connector element and cooperatively engageable with structural elements connected together by the connector assembly, respectively, the connector assembly being configured for allowing relative movements of structural elements connected together by the connector assembly in any direction generally perpendicular to the predetermined direction within a predetermined range of movement;
 at least one resilient element retained between the opposite end portions of the at least one connector element so as to be located between two structural elements connected together by the connector assembly in a position for resiliently absorbing at least a portion of any vibrations or shock loads exerted in the predetermined direction;
 at least one bearing element disposed between the opposite end portions of the at least one connector element and configured for bearing loads exerted in the predetermined direction while allowing substantially free relative movements, including linear movements, of two structural elements connected together by the connector assembly in substantially any directions generally perpendicular to the predetermined direction within the predetermined range of movement allowed by the connector assembly, wherein the connector element extends between the structural elements through a passage through the at least one resilient element and the at least one bearing element, wherein the passage has a first extent in the direction generally perpendicular to the predetermined direction; and
 a tubular spacer extending around the connector element and through the passage through the at least one resilient element, the tubular spacer has a second extent in the direction generally perpendicular to the predetermined direction, wherein the second extent is smaller than the first extent to define a non-contacting space between resilient element and the tubular spacer when the connector element is in a centered position within the passage, the non-contacting space extending substantially along the length of the connector element, thereby providing relative movement of the structural elements in any direction generally perpendicular to the predetermined direction within the predetermined range of movement.

14. The vibration isolator of claim 13, wherein the predetermined range of movement has an extent of about 15 millimeters.

15. The vibration isolator of claim 13, wherein the resilient element includes a resilient portion disposed between the connector element and the at least one bearing element.

16. The vibration isolator of claim 15, wherein the at least one bearing element comprises a plurality of bearings retained in an array around the connector element.

17. The vibration isolator of claim 13, wherein the at least one bearing element includes a plurality of ball transfer units.

18. The vibration isolator of claim 17, wherein the ball transfer units are arranged in an array around a central region of the vibration isolator.

19. The vibration isolator of claim 17, wherein each of the ball transfer units comprises a ball bearing of a first diametrical extent supported by a plurality of ball bearings of a second diametrical extent smaller than the first diametrical extent.

20. A vibration isolator, comprising:
 at least one connector element configured for extending in a predetermined direction between two structural elements for connecting the structural elements together while allowing at least substantially free relative movements therebetween in substantially any direction at least generally perpendicular to the predetermined direction within a predetermined limited range of movement;
 at least one resilient element disposed in connection with the at least one connector element and operable for cushioning at least a portion of any vibrations or shock loads exerted against the resilient element at least generally in the predetermined direction; and
 at least one ball transfer unit disposed in connection with the at least one resilient element and configured for bearing loads exerted in the predetermined direction between structural elements connected together by the at least one connector element, while allowing substantially free relative movements, including linear movements, of structural elements connected together by the at least one connector element in substantially any direction at least generally perpendicular to the predetermined direction and within the predetermined limited range of movement allowed by the at least one connector element, wherein the connector element extends between the structural elements through a passage through the at least one resilient element and the at least one ball transfer unit, wherein the passage has a first extent in the direction generally perpendicular to the predetermined direction; and
 a tubular spacer extending around the connector element and through the passage through the at least one resilient element, the tubular spacer has a second extent in the direction generally perpendicular to the predetermined direction, wherein the second extent is smaller than the first extent to define a non-contacting space between the resilient element and the tubular spacer when the connector element is in a centered position within the passage, the non-contacting space extending substantially along the length of the connector element, thereby providing at least substantially free relative movements between structural elements in substantially any direction at least generally perpendicular to the predetermined direction within the predetermined limited range of movement.

21. The vibration isolator of claim 20, comprising a plurality of the ball transfer units.

22. The vibration isolator of claim 21, wherein the ball transfer units are arranged in an array extending around a central region of the vibration isolator.

23. The vibration isolator of claim 20, wherein the ball transfer unit comprises a ball bearing of a first diametrical extent supported by a plurality of ball bearings of a second diametrical extent smaller than the first diametrical extent.

24. The vibration isolator of claim 20, comprising two structural elements connected together by the vibration isolator, wherein one of the structural elements comprises a frame of a vehicle and another of the structural elements comprises a structural element configured for supporting an operator or a passenger on the vehicle.

25. The vibration isolator of claim 24, wherein the structural element configured for supporting an operator or a passenger on the vehicle is supported on the frame by the vibration isolator.

26. The vibration isolator of claim 25, wherein the predetermined direction is at least generally vertical, and the at least one ball transfer unit will bear any downwardly directed loads exerted by the structural element configured for supporting an operator or a passenger on the vehicle, while allowing substantially free at least generally horizontal movements of the frame relative to the structural element configured for supporting an operator or a passenger on the vehicle, including linear movements, within the predetermined limited range of movement allowed by the at least one connector element.

27. The vibration isolator of claim 25, wherein the structural element configured for supporting an operator or a passenger on the vehicle comprises a seat.

28. The vibration isolator of claim 25, wherein the structural element configured for supporting an operator or a passenger on the vehicle comprises an operator cab of the vehicle.

29. A work machine comprising:
   a frame supported on wheels or tracks operable for travel over ground and road surfaces;
   apparatus in connection with the frame and operable for causing at least generally horizontal vibratory movements of the frame;
   an operator cab configured for supporting at least one person;
   at least one vibration isolator supporting the operator cab on the frame, the vibration isolator including at least one connector element retaining the operator cab on the frame while allowing a limited range of at least generally horizontal relative movements therebetween, the limited range corresponding to a horizontal extent of the at least some of the vibratory movements of the frame, and at least one bearing element supporting at least a portion of the cab and defining an at least generally horizontal contact interface along which the bearing element allows substantially free vibratory movements, including linear movements, of the frame relative to the cab within the limited range, wherein the at least one vibration isolator additionally includes at least one resilient element supporting the at least one bearing element, wherein the connector element extends between the cab and the frame through a passage through the at least one resilient element and the at least one bearing element, wherein the passage has a first extent in the direction of the horizontal contact interface; and
   a tubular spacer extending around the connector element and through the passage through the at least one resilient element, the tubular spacer has a second extent in the direction of the horizontal contact interface, wherein the second extent is smaller than the first extent to define a non-contacting space between the resilient element and the tubular spacer when the connector element is in a centered position within the passage, the non-contacting space extend in substantially along the length of the connector element, thereby providing allow a limited range of at least generally horizontal relative movements between the cab and the frame.

30. The work machine of claim 29, wherein the bearing element comprises a plurality of ball bearings retained in a bearing race extending around the connector element.

31. The work machine of claim 29, wherein the bearing element comprises a ball transfer unit.

32. The work machine of claim 31, wherein the ball transfer unit comprises a ball bearing of a first diametrical extent supported by a plurality of ball bearings of a second diametrical extent smaller than the first diametrical extent.

33. The work machine of claim 31, comprising a plurality of the ball transfer units arranged in an array around the connector element.

* * * * *